(12) United States Patent
Lee

(10) Patent No.: US 9,719,555 B2
(45) Date of Patent: Aug. 1, 2017

(54) LOCKABLE HINGE ARRANGEMENT

(71) Applicant: Chunghsin Lee, Las Vegas, NV (US)

(72) Inventor: Chunghsin Lee, Las Vegas, NV (US)

(73) Assignee: FTR Systems, Inc, Las Vegas, NV (US)

( * ) Notice: Subject to any disclaimer, the term of this patent is extended or adjusted under 35 U.S.C. 154(b) by 0 days.

(21) Appl. No.: 14/998,402

(22) Filed: Dec. 31, 2015

(65) Prior Publication Data

US 2016/0223012 A1 Aug. 4, 2016

Related U.S. Application Data

(60) Provisional application No. 62/125,738, filed on Jan. 29, 2015.

(51) Int. Cl.
| | | |
|---|---|---|
| *E05D 11/10* | (2006.01) | |
| *F16C 11/10* | (2006.01) | |
| *B62K 15/00* | (2006.01) | |
| *F16C 11/04* | (2006.01) | |

(52) U.S. Cl.
CPC ............. *F16C 11/10* (2013.01); *B62K 15/00* (2013.01); *E05D 11/1014* (2013.01); *F16C 11/045* (2013.01)

(58) Field of Classification Search
CPC . E05D 11/10; E05D 11/1007; E05D 11/1014; F16C 11/00; F16C 11/10; F16C 11/04
See application file for complete search history.

(56) References Cited

U.S. PATENT DOCUMENTS

| | | | | |
|---|---|---|---|---|
| 917,768 | A * | 4/1909 | Jordan | E05D 11/1007 16/325 |
| 2,427,384 | A * | 9/1947 | Bushko | E05D 5/10 16/325 |
| 3,360,155 | A * | 12/1967 | Colonna | F16J 13/02 220/325 |
| 3,629,900 | A * | 12/1971 | Beerli, Jr. | E05D 11/1007 16/325 |
| 3,666,134 | A * | 5/1972 | Rauch | E05B 65/006 174/50 |
| 6,523,223 | B2 * | 2/2003 | Wang | B62K 15/006 16/319 |

(Continued)

FOREIGN PATENT DOCUMENTS

| | | | | |
|---|---|---|---|---|
| WO | WO 2004056646 A1 * | 7/2004 | | B62K 15/006 |
| WO | WO 2009006785 A1 * | 1/2009 | | B62K 15/006 |

*Primary Examiner* — Chuck Mah
(74) *Attorney, Agent, or Firm* — Don Halgren

(57) ABSTRACT

A lockable hinge arrangement comprising a first hinge plate and a second hinge plate, wherein the first and the second hinge plates being hingedly connected to one another at one elongated first edge thereof to comprise the hinge arrangement. The hinge arrangement further a longitudinally displaceable elongated locking plate slidably attached to a second elongated edge of the second plate, the displaceable locking plate arranged to secure and release the first plate and the second plate from one another. A locking plate cam arrangement effects and permits the locking and forced separating release of the first plate and the second plate from rigid securement with one another. The elongated locking plate is acted upon by both a first cam arrangement and a second cam arrangement.

10 Claims, 10 Drawing Sheets

(56) References Cited

U.S. PATENT DOCUMENTS

| | | | | |
|---|---|---|---|---|
| 6,827,518 B2* | 12/2004 | Hon | .................... | B62K 15/006 16/324 |
| 7,353,731 B2* | 4/2008 | Lin | ...................... | B62K 21/12 74/551.7 |
| 7,730,586 B2* | 6/2010 | McDonald | ............... | B60R 7/04 16/326 |
| 2009/0031531 A1* | 2/2009 | Chang | .................. | G06F 1/1679 16/333 |
| 2014/0140756 A1* | 5/2014 | Bettin | ................. | B62K 15/006 403/110 |

* cited by examiner

LOCKABLE HINGE ARRANGEMENT

BACKGROUND OF THE INVENTION

Field of the Invention

This invention relates to hardware products and more particularly to hinges, especially hinges which are lockable into a closed orientation, the present Non-Provisional Application based on Provisional Application No. 62/125,738, filed Jan. 29, 2015 which was a continuation-in-part application of Provisional Application No. 62/123,292, filed 13 Nov. 2014, each of which are incorporated herein by reference in their entirety.

DISCUSSION OF THE ART

Hinges by their nature are the weak link in any structure. They must keep their adjoining/attached articulatable structure portions in secure alignment with one another and they must provide rigid continuity of components with minimal likelihood of failure or separation. This is particularly critical when such hinge is utilized to connect structural portions which support something for example, a human being, as identified in latter one of the aforementioned Provisional Applications.

It is thus an object of the present invention to overcome the disadvantages of the prior art.

It is a further object of the present invention to provide a hinge arrangement which is readily lockable and unlockable.

It is yet another object of the present invention to provide a hinge arrangement with multiple interlocking securement points.

It is still yet another object of the present invention to provide a hinge arrangement which permits communication through and between corresponding portions of the hinge arrangement's connected structures.

It is still yet a further object of the present invention to provide a biased release mechanism to open the hinge arrangement.

It is still yet a further object of the present invention to provide a multiple cammed engagement between the side components of the hinge arrangement.

It is still another object of the present invention to provide yet a further cam arrangement interlocking the side portions of the hinge arrangement together.

BRIEF SUMMARY OF THE INVENTION

The present invention comprises a lockable hinge arrangement for enabling the folding of an attached pair of structures from a locked, size extended configuration, as shown in the aforementioned application, to a folded, compressed structural configuration so as to minimize storage space, as also shown and described in the foregoing referenced application, and facilitate carrying of that folded structure, for example, a foldable bicycle frame, as may be seen in the aforementioned provisional application.

Such a lockable hinge arrangement has a first side plate and a second side plate pivotally secured to one another by a pintle, which pintle is connectively inserted through a first plate knuckle and a pair of spaced-apart second plate knuckles. The lockable hinge arrangement absent any structures secured as by for example, welding, bolts or the like, to the respective first and second side plates, as may be seen in the aforementioned provisional application, which is incorporated herein by reference.

The lockable hinge in a closed locked configuration has an elongated locking plate which is slidably secured to a front edge of the first plate, by a spaced apart pair of locking plate securement pins. The locking plate has a pair of elongated slots through which the locking plate securement pins extend to permit secured, slot-limited longitudinal movement of the elongated locking plate when biased downwardly into a hinge-locked configuration, by the action of a lever actuated eccentric dual-surface cam pressing against a cam plate mounted on the locking plate flange.

The lockable hinge (release) lever is snap secured in a lever catch. In this stage, the release lever is stored parallel to the first and the second plates upper side. The lever catch mounted on the upper surface of the first plate has a catch flange on one side thereof. The lever is releasable by a downward pressure on the catch flange. Movement of the lever effects a rotation of the dual surface cam about its rotational axis to reduce the pressure of the cam on the cam plate mounted on the locking plate flange.

Upon release of the downward pressure effected by the dual surface cam, a biasing spring arranged between the underside of the locking plate flange and the upper side of the first plate effects a longitudinal displacement of the locking plate thus releasing the upper engagement pin, the middle engagement pin and the lower engagement pin from their locked and secured engagement with the upper engagement pin receiving slot, the middle engagement pin receiving slot and the lower engagement pin receiving slot, respectively. The upper engaging pin receiving slot and the middle engagement pin receiving slot each have a somewhat "S" shaped curvilinear cam surface so as to effectuate a biasing against the upper engagement pin and the middle engagement pin on the first plate thus facilitating the pivoting of the first plate from the second plate around the pintle connecting the first plate and the second plate.

First and second plate structure-to-structure have communication ports. Such communication ports each receive their respective ends of a collapsible or shrinkable structure-to-structure communication conduit. The structure-to-structure flexible, tubular, length-compressible communication conduit is utilized to safely enclose and protect therewithin any cables, electrical lines or fluid conduits which might otherwise be exposed to wear or damage.

Such cables or electrical lines may be envisaged in the aforementioned provisional patent application cited hereinabove, which extend between a structure attached to the first plate and a structure attached to the second plate.

It is to be noted that the release spring for biasing the locking plate from engagement with the respective upper engagement pin, the middle engagement pin and the lower engagement pin, is secured about a spring supporting shaft which spring supporting shaft extends through the locking plate flange, the cam plate being disposed on the upper side of the locking plate flange and the release spring having an upper end which is being biased against the lower side of the locking plate flange, they release spring having a lower end which biases against a shoulder on the first plate within its upper side thereof.

The locking plate flange may have an upstanding finger having a distal end which mates with and tracks arcuate guide track arranged on each outwardly facing side of the dual surface cam.

Thus, what is shown and described is a unique hinge for connecting and locking together and enabling the unlocking from one another, two elongated structures, which however remain pivotally connected to one another.

The invention thus comprises a lockable hinge arrangement for enabling the dimensional conversion of an elongated pair of structures, wherein one of the pair of structures is arranged to be attached to a first hinge plate and the other of the pair of structures is arranged to be attached to a second hinge plate, the first and the second hinge plates being hingedly connected to one another at one elongated first edge thereof to comprise the hinge arrangement, the hinge arrangement further comprising: a longitudinally displaceable elongated locking plate slidably attached to a second elongated edge of the second plate, the displaceable locking plate arranged to secure and release the first plate and the second plate from one another, and a locking plate cam arrangement for effecting and permitting locking and forced separating release of the first plate and the second plate from rigid securement with one another. The locking plate cam arrangement preferably comprises a rotatable lever actuated first cam attached onto the top edge of the second plate, to enable simple locking and unlocking of the locking plate cam arrangement from above. The locking plate cam arrangement preferably includes a forced-plate-release second cam arrangement engaged with the second elongated edge of the first plate and the second plate. The second cam arrangement comprises at least one pin arranged on the second elongated edge of the first hinge plate. The second cam arrangement also comprises a plurality of pin receiving curvilinear slots having cam surfaces for enabling the forced separating, by pushing, of the first and second plates apart when the locking plate is displaced. The locking plate is movably secured to the second elongated edge of the second hinge plate. A biasing spring is utilized to displace the locking plate when the locking plate first cam is rotatably released by the rotatable lever. The first cam has an axis of rotation which is perpendicular to the longitudinal axis of the at least one pin extending from the second elongated edge of the first hinge plate. The locking plate cam arrangement comprises two sets of cams, wherein a first cam movement enables actuation of a second cam movement, to enable a biased hinged separation of the first and the second hinge plates. The first and second hinge plates each have a co-aligned conduit accepting port extending thereacross to enable secure conduit enclosed communication between the structure attached to each respective hinge plate.

The invention also comprises a method of releasing a lockable hinge relationship of a first hinge plate and a second hinge plate secured in a parallel relationship, to a first hinge plate and a second hinge plate biased-open non-parallel relationship, comprising one or more of the steps of: arranging a first cam arrangement on an upper edge of the second hinge plate; arranging a second cam arrangement on an elongated edge of the first hinge plate; rotating the first cam arrangement about a first axis to enable an elongated locking plate attached to the second hinge plate to bias pivotable open the first hinge plate from the second hinge plate; pivoting a lever comprising a part of the first cam arrangement so as to enable the rotation of the first cam arrangement about the first axis to enable release-directed movement of the elongated locking plate from a hinge locked configuration on the second hinge plate to a hinge openable configuration; pushing a flanged upper end of the elongated locking plate upwardly away from the upper edge of the second hinge plate to enable released displacement of the elongated locking plate with respect to the first elongated edges of the first hinge plate and the second hinge plate; enabling the pushing of the flanged upper end of the elongated locking plate by the placement of a compressed spring placed between the upper edge of the second hinge plate and the flanged upper end of the elongated locking plate; rubbing a pin extending perpendicularly outwardly from the elongated edge of the first hinge plate against a sloped curvilinear cam surface of a slot arranged in the released, displaced elongated locking plate to effect a cammed pushing open of the elongated edge of the first plate from the elongated edge of the second plate; and arranging a communication port through correspondingly adjacent locations in the first hinge plate and the second hinge plate to permit a communication conduit to be safely arranged therebetween.

The invention also comprises lockable hinge arrangement comprising a first hinge plate and a second hinge plate, the first and the second hinge plates being hingedly connected to one another at one elongated first edge thereof to comprise the hinge arrangement, the hinge arrangement further comprising: a longitudinally displaceable elongated locking plate slidably attached to a second elongated edge of the second plate, the displaceable locking plate arranged to secure and release the first plate and the second plate from one another, and a locking plate cam arrangement for effecting and permitting locking and forced separating release of the first plate and the second plate from rigid securement with one another. The elongated locking plate is acted upon by a first cam arrangement and a second cam arrangement. Movement of the first cam arrangement effects movement of the second cam arrangement, and the first cam arrangement comprises a lever movable eccentrically rotated wheel pressing against a portion of the elongated displaceable locking plate, and the second cam arrangement comprises at least one pin on the first hinge plate in a cammed relationship with at least one cam slot on the elongated locking plate to effect a biasing apart of the first hinge plate from the second hinge plate.

BRIEF DESCRIPTION OF THE DRAWINGS

The objects and advantages of the present invention will become more apparent when viewed in conjunction with the following drawings, in which:

FIG. 10 is a pictorial representation, in perspective, of the lockable hinge arrangement showing a collapsible structure-to-structure communication conduit connectively arranged there between;

DETAILED DESCRIPTION OF THE PREFERRED EMBODIMENTS

Figure 1:
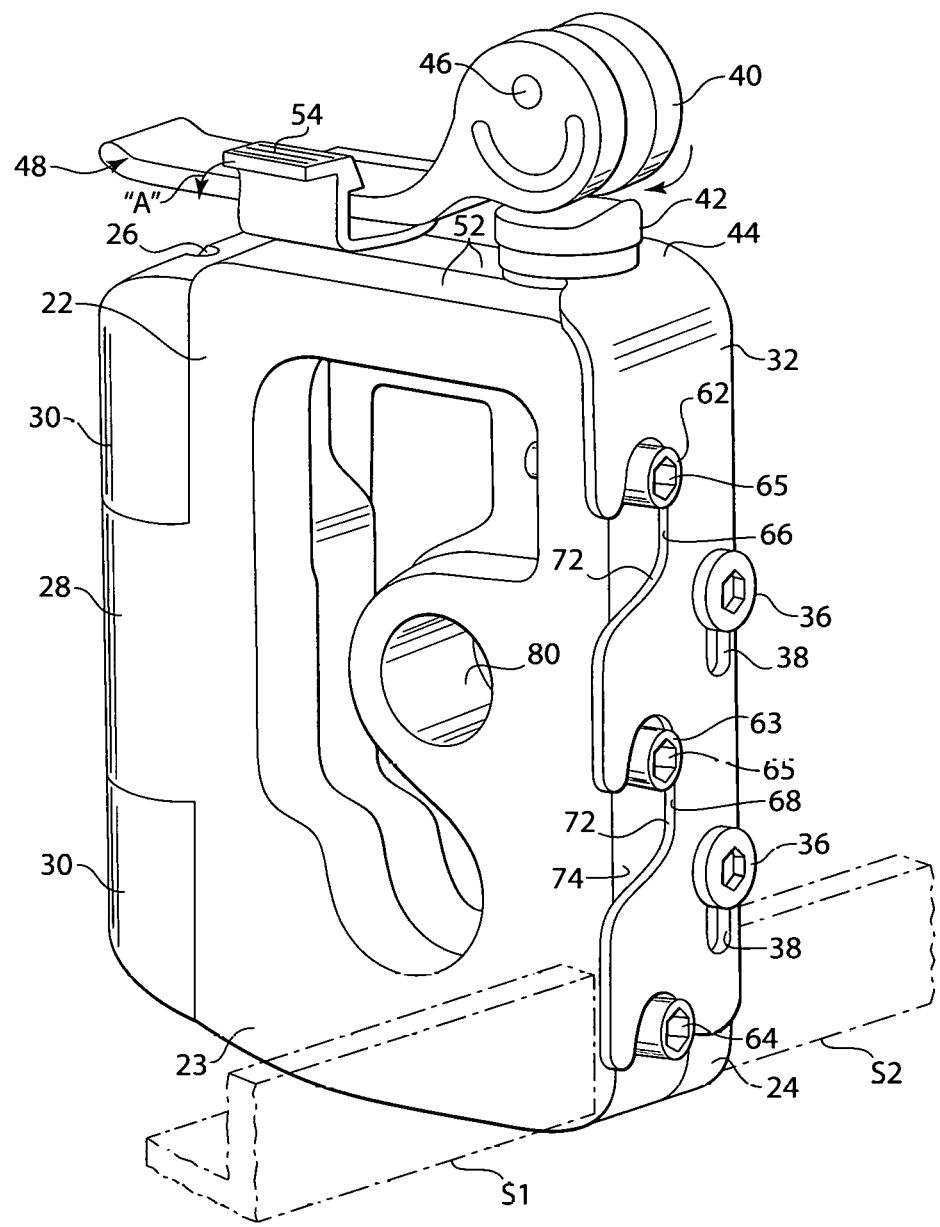
FIG. 1 is a perspective view of the lockable hinge arrangement in a closed configuration, shown without attachment to any structural components.
Figure 2:
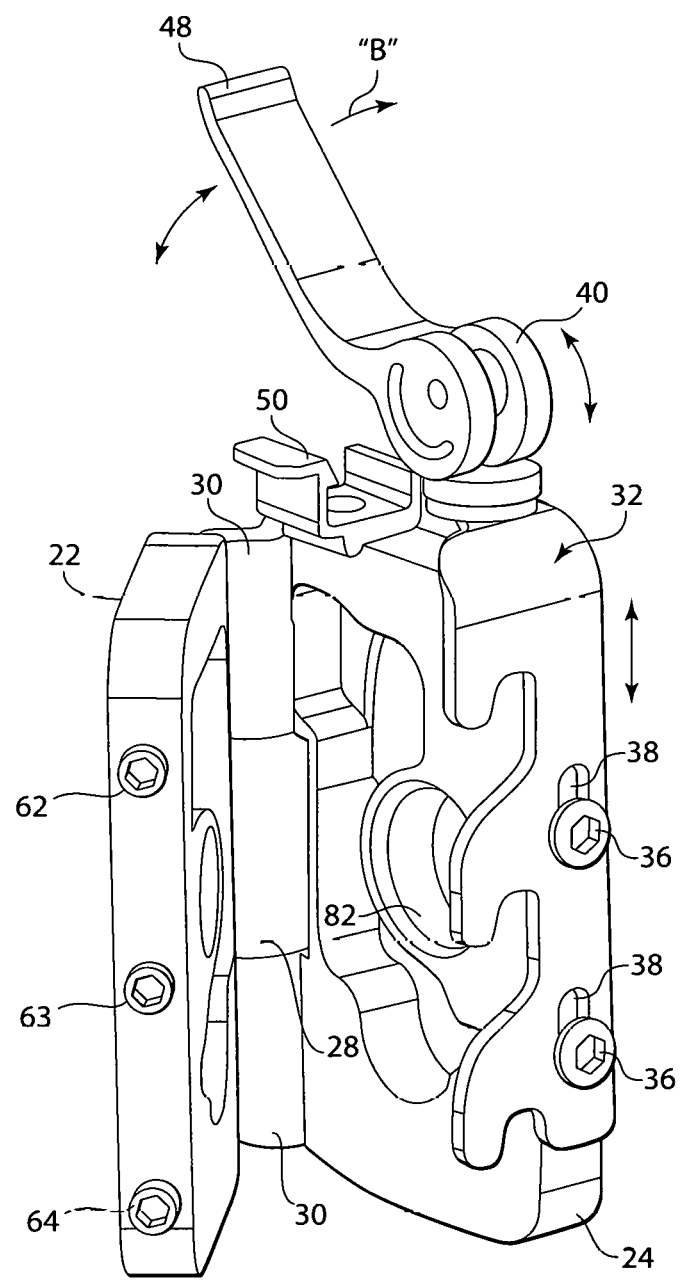
FIG. 2 is a perspective view of the lockable hinge arrangement shown in FIG. 1, now represented in a slightly open configuration.

Referring now to the drawings in detail, and particularly to FIG. 1, there is shown the present invention which comprises the lockable hinge 20 for enabling the folding of an attached pair of structures from a locked, size extended configuration, as shown in the aforementioned Provisional Application No. 62/123,292, to a folded, compressed structural configuration so as to minimize storage space, as also shown and described in the foregoing referenced application, and facilitate carrying of that folded structure, for example, a foldable bicycle frame, as may be seen in such aforementioned '292 provisional application.

Such a lockable hinge 20 has a first side plate 22 having a facial plane 23 and a second side plate 24 pivotally secured to one another at a first elongated edge thereof by a pintle 26, which pintle 26 is connectively inserted through a first plate knuckle 28 and a pair of spaced-apart second plate knuckles 30. The lockable hinge arrangement 20 secured to a pair of structures S1 and S2, represented in phantom in FIG. 1, may be secured as by for example, welding, bolts or the like, to the respective first and second side plates 22 and 24 as may be seen in the aforementioned provisional application, which is incorporated herein by reference.

Figure 3:
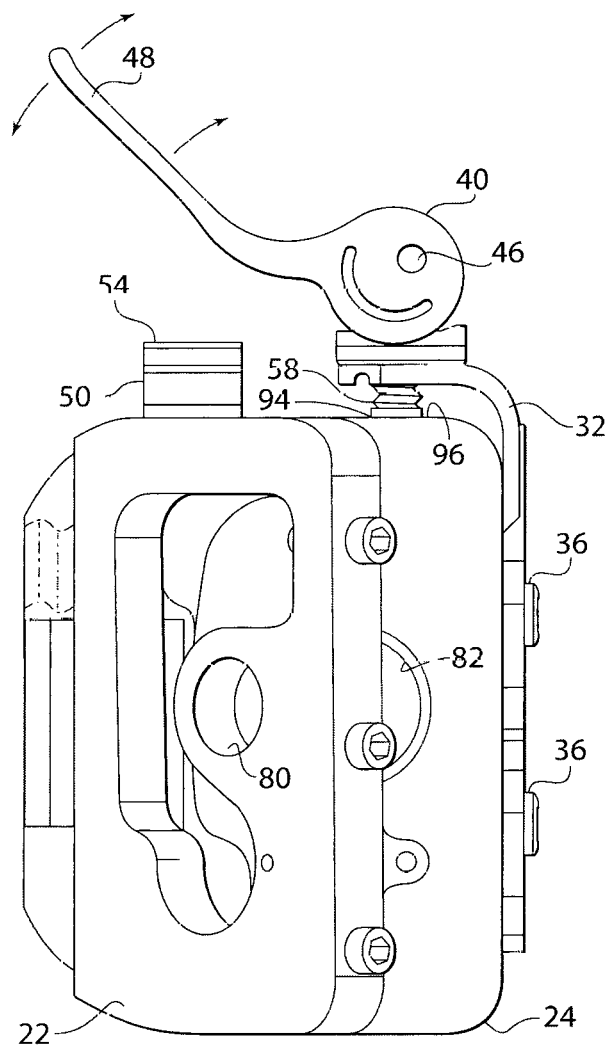
FIG. 3 is a side elevational view of the lockable hinge arrangement shown in FIG. 2, again in a slightly open configuration.
Figure 4:
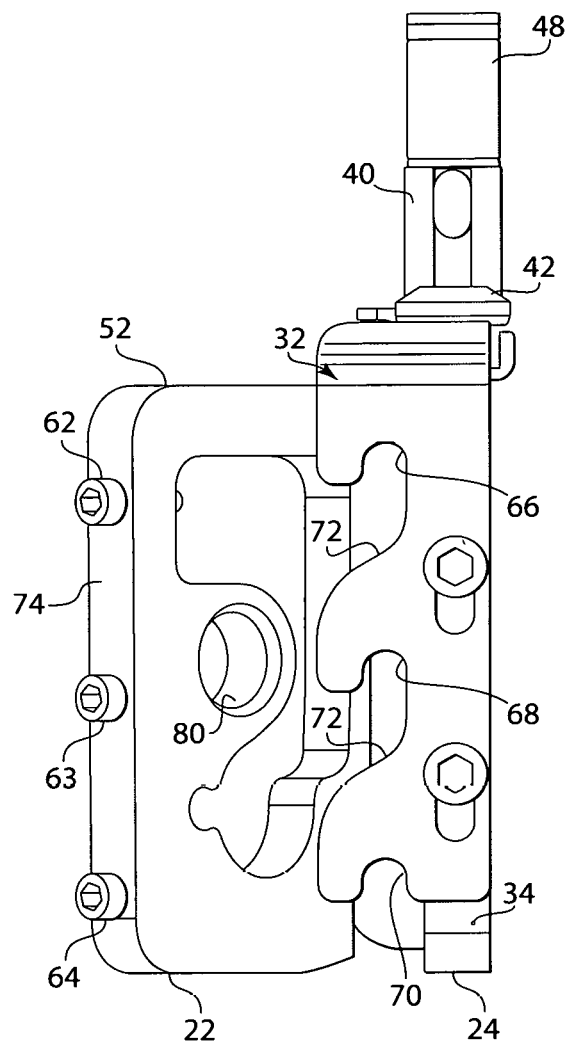
FIG. 4 is an end view of the side elevational view of the lockable hinge arrangement shown in FIG. 3.

The lockable hinge 20 in a closed locked configuration as shown in FIG. 1, has an elongated, inverted, generally L-shaped locking plate 32 which is slidably secured to a second elongated edge 34, best seen in FIG. 4, of the second plate 24, by a spaced apart pair of locking plate securement pins 36, shown in FIGS. 1, 2, 3 and 4. The L-shaped locking plate 32 has an arrangement of elongated slots 38, in parallel alignment with the longitudinal axis L1 of the locking plate 32, and through which the locking plate securement pins 36 extend to permit secured, slot-limited longitudinal movement of the elongated locking plate 32 when biased downwardly into a hinge-locked configuration, represented in FIG. 1, by the action of a eccentrically rotated circularly shaped dual-surface cam 40 pressing against a single cam plate 42 mounted on the biased locking plate flange 44. The dual surface cam 40 is rotated about its eccentric axis 46 arranged normal to the second side plate 24 by a release lever 48 fixedly secured to the cam 40. The eccentric axis 46 is arranged perpendicular to the longitudinal axis L1 of the locking plate 32 to properly align the lever 48 to line up with the second plate 24 and facilitate release and locking of the lever 48 with respect to the lever catch flange 54.

Figure 7:
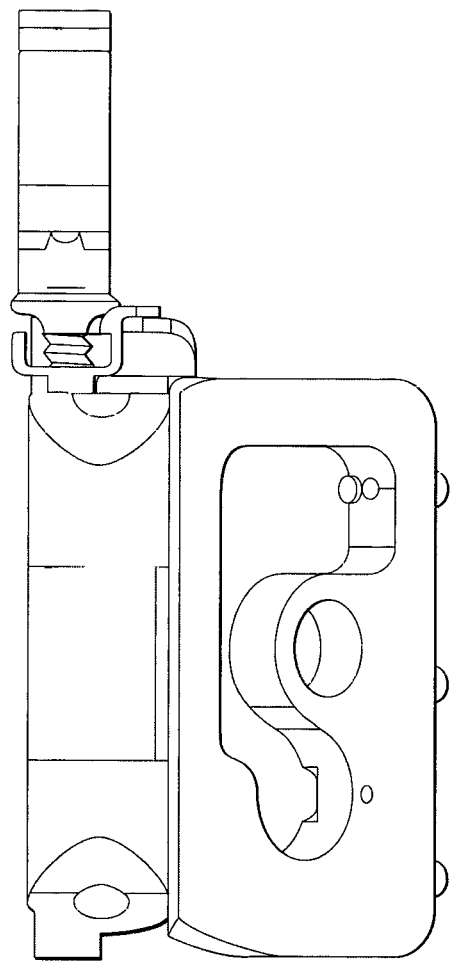
FIG. 7 is an edge view of the back side of the lockable hinge arrangement shown in FIG. 4.
Figure 8:
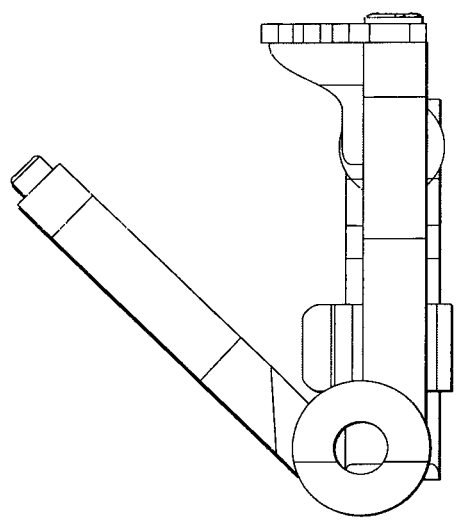
FIG. 8 is a bottom view of the lockable hinge arrangement of that view shown in FIG. 6.

The lockable hinge (release) lever 48 is snap secured in a lever catch 50. In this stage, the release lever 48 is stored parallel to the upper surface 52 of the first and the second plates 22 and 24 and the lever catch 50 is fixedly attached to the upper surface 52 of the second plate 24, as may be seen in FIGS. 1, 2 and 7. The lever catch 50 mounted on the upper surface 52 of the second plate 24 has a catch flange 54 on one side thereof. The lever 48 is releasable the locking configuration of the lever catch 50 by a downward pressure on the catch flange 54. Lifting movement of the lever 48 effects a rotation of the dual surface cam 40 about its eccentric rotational support axis 46 to reduce the pressure of the cam 40 on the cam plate 42 mounted on the locking plate flange.

Figure 5:
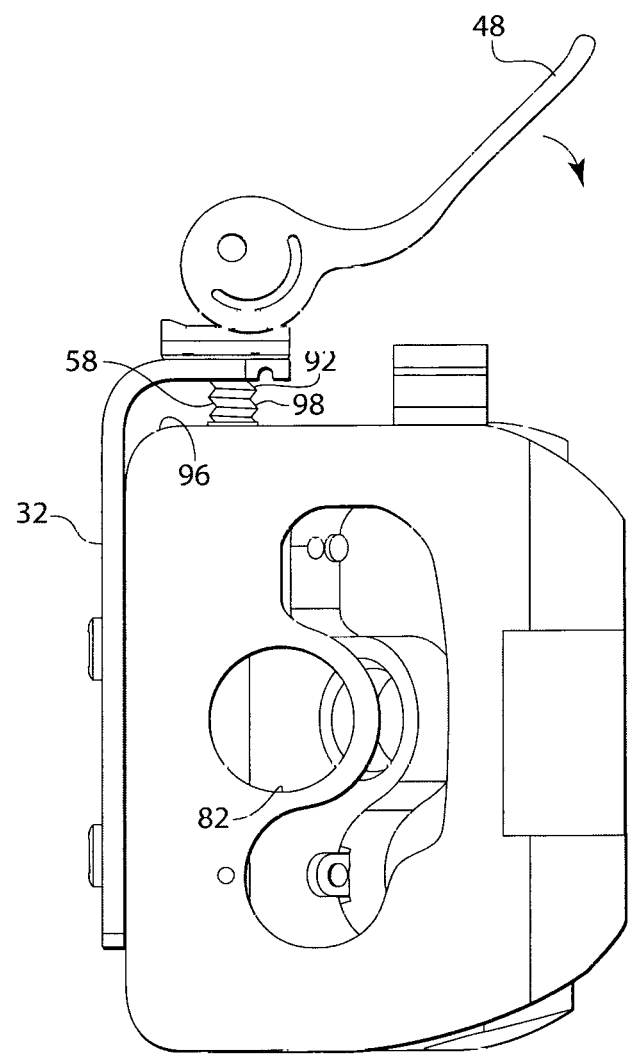
FIG. 5 is a side elevational view of the lockable hinge arrangement with its opposite side plate of that shown in FIG. 3.
Figure 6:
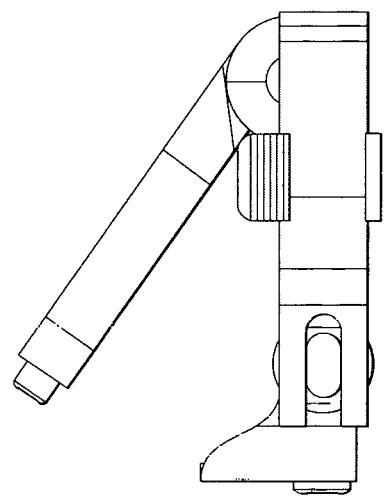
FIG. 6 is a plan view of the lockable hinge arrangement.

Upon release of the downward pressure effected by the position-locked dual surface cam 40, a biasing spring 58, best seen in FIGS. 3 and 5, is arranged between the underside of the locking plate flange 44 and the upper surface 52 of the second plate 24 effects an upward longitudinal displacement of the locking plate 32 thus slidably releasing the upper engagement pin 62, the middle engagement pin 63 and the lower engagement pin 64 from their locked and secured engagement with their respective upper engagement pin receiving slot 66, the middle engagement pin receiving slot 68 and the lower engagement pin receiving slot 70, respectively. The engagement pins 62, 63 and 64 have a longitudinal axis 65 which extend in a plane parallel to the facial plane 23 of the first side plate 22. The upper engaging pin receiving slot 66 and the middle engagement pin receiving slot 68 each have a somewhat "S" shaped curvilinear cam surface 72 so as to effectuate a biasing against the upper engagement pin 62, the middle engagement pin 63 and the lower engagement pin 64 on the second elongated edge or front edge surface 74 of the first plate 22 thus facilitating the biased opening and pivoting of the first plate 22 from the second plate 24 around the pintle 26 connecting the first plate 22 and the second plate 24. Release of the lever 48 from the locking plate flange 54 thus permits/effects rotation of the eccentrically mounted cam 40 about its axis 46 permitting the biasing spring 58 to push the L-shaped locking plate 32 from securement with the engagement pins 62, 63 and 64, the respective S shaped curve 72 on the upper and the middle slots 66 and 68 and thus releasing the first plate 22 from locked adjacent capture against the second plate 24. Reversal of the lever 58 will enable sliding engagement and locking of the locking plate 32 into engagement with the pins 62, 63 and 64 on the front edge surface 74 of the first plate 22.

The first and second plates 22 and 24 of the hinge arrangement 20 structure-to-structure each have axially aligned conduit-connected communication ports 80 and 82, as may be seen in FIGS. 1 and 2, and 10, 11 and 12. Such communication ports 80 and 82 each receive their respective ends of a collapsible or axially shrinkable structure-to-structure communication conduit 84, as may be seen in FIGS. 10, 11 and 12. The structure-to-structure flexible, tubular, length-compressible communication conduit 84 is utilized to safely enclose and protect therewithin any cables, electrical lines or fluid conduits which might otherwise be exposed to wear, crimping or damage by the surfaces or edges of the hinge 20.

Such cables or electrical lines may be envisaged in the aforementioned provisional patent application cited hereinabove, which extend between a structure (i.e. a portion of a bicycle frame) welded or boltably attached to the outwardly facing surface of the first plate 22 and a structure (i.e. another portion of the to-be-folded bicycle frame) welded or boltably attached to the outwardly facing surface of the second plate 24.

Figure 9:
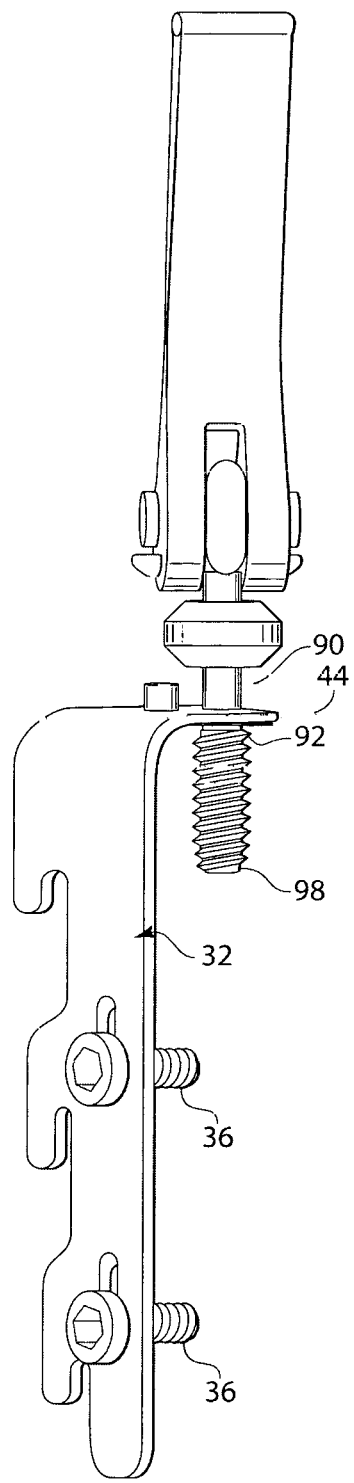
FIG. 9 is a side elevation of view in slight perspective, of the locking plate, the locking plate flange and the locking plate biasing spring.

It is to be noted that the release spring 58 for biasing the locking plate 32 from engagement with the respective upper engagement pin 62, the middle engagement pin 63 and the lower engagement pin 64, is secured about a spring supporting shaft 90 which spring supporting shaft 90 extends through the locking plate flange 44, the cam plate 42 which is disposed on the upper side of the locking plate flange 44 and the release spring 58 having an upper end 92 which is being biased against the lower side of the locking plate flange 44, as shown in FIGS. 3, 5 and 9, the release spring 58 having a lower end 94 which biases against a shoulder 96 on the second plate 24 on its upper side thereof, as may be seen in FIG. 3.

Figure 10:
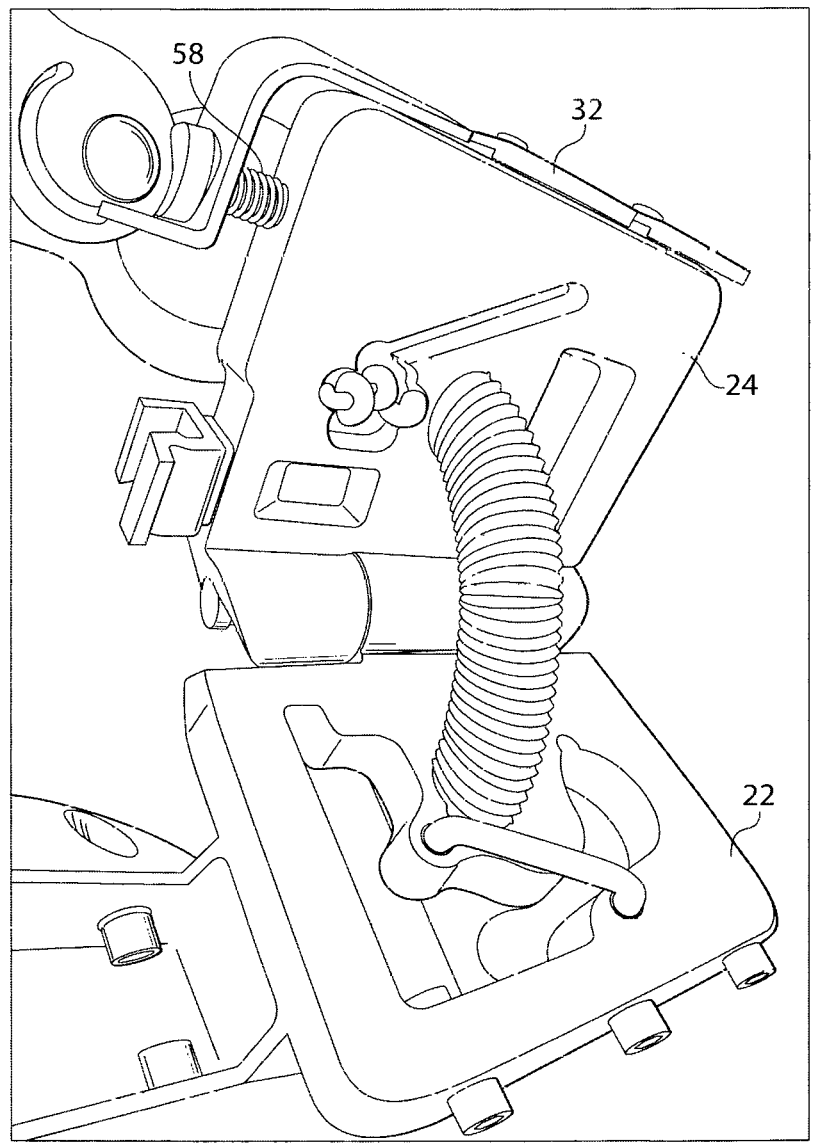
Figure 11:
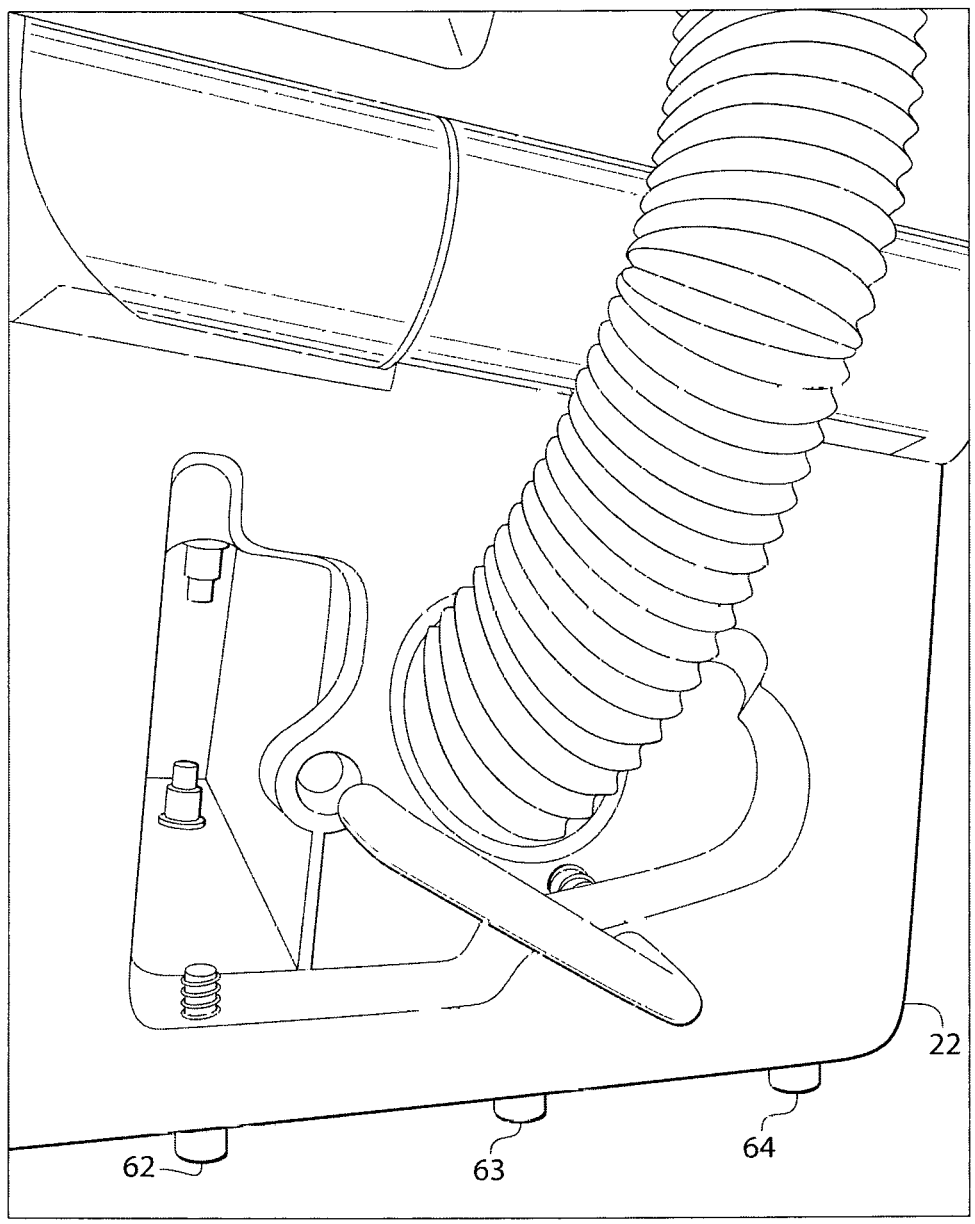
FIG. 11 is a pictorial representation, in partial perspective of the first side plate and the collapsible structure-to-structure communication conduit registered thereto.
Figure 12:
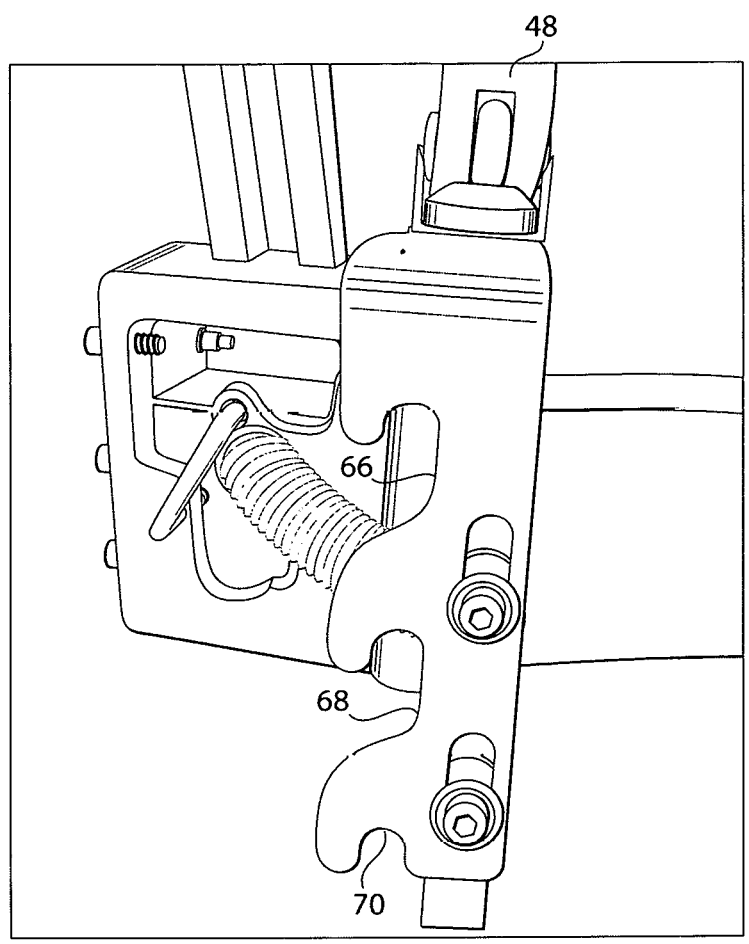
FIG. 12 is a pictorial representation of the locking plate, the locking plate flange and the lever arranged on the second side plate of the lockable hinge arrangement, wherein the locking plate is in its unlocked configuration.

The locking plate flange 44 may have an upstanding finger 45, as shown in FIG. 10, having a distal end which mates with and tracks arcuate guide track 47, as shown in FIG. 10, and also in FIG. 3, arranged on each outwardly facing side of the dual surface cam 40.

Thus, what is shown and described is a unique hinge for connecting and locking together and enabling the unlocking from one another, two elongated structures, which however remain pivotally connected to one another.

The invention claimed is:

1. A lockable hinge arrangement for enabling the dimensional conversion of an elongated pair of structures, wherein one of the pair of structures is arranged to be attached to a first hinge plate and the other of the pair of structures is arranged to be attached to a second hinge plate, the first and the second hinge plates being hingedly connected to one another at one elongated first edge thereof to comprise the hinge arrangement, the hinge arrangement further comprising:
 a cam lever actuated longitudinally displaceable elongated locking plate slidably attached to a second elongated edge of the second hinge plate, the displaceable elongated locking plate arranged to secure and release the first hinge plate and the second hinge plate from one another, the displaceable elongated locking plate on the second hinge plate having a multiple cam slot arrangement thereon which permits engagement and disengagement of a corresponding multiple pin arrangement on a second edge of the first hinge plate, the engagement and disengagement of the pin arrangement with respect to the cam slot arrangement and hence locking and unlocking of the hinge plates being dependent upon the direction of longitudinal displacement movement of the elongated locking plate, and
 a locking plate cam lever arrangement for effecting the longitudinal movement of the elongated locking plate by a biased eccentric rotation thereagainst and therefrom thus permitting locking together and forced separating release of the first hinge plate and the second hinge plate from rigid securement with one another.

2. The lockable hinge arrangement as recited in claim 1, wherein the locking plate cam lever arrangement comprises a rotatable lever actuated first cam attached onto a top edge of the second plate, to bias a flange on an upper end of the elongated locking plate so as to enable simple locking and unlocking of the displaceable elongated locking plate cam lever arrangement from thereabove.

3. The lockable hinge arrangement as recited in claim 2, wherein longitudinal movement of the displaceable locking plate effects a forced release of a second cam arrangement interengaged between the second elongated edge of the first hinge plate and the second hinge plate.

4. The lockable hinge arrangement as recited in claim 3, wherein the second cam arrangement comprises pin receiving curvilinear slots of the multiple cam slot arrangement having cam surfaces for enabling forced separating, by pushing, of the first and second hinge plates apart when the elongated locking plate is displaced.

5. The lockable plate hinge arrangement as recited in claim 4, including a biasing spring to displace the elongated locking plate when the locking plate first cam is rotatably released a rotatable lever.

6. The lockable hinge arrangement as recited in claim 3, wherein the first cam has an axis of rotation which is perpendicular to the longitudinal axis of at least one of the pins of the multiple pin arrangement extending from the second elongated edge of the first hinge plate.

7. The lockable plate hinge arrangement as recited in claim 1, wherein the first and second hinge plates each have a co-aligned conduit accepting port extending thereacross to enable secure conduit enclosed communication between the structure attached to each respective hinge plate.

8. A method of releasing a lockable hinge relationship of a first hinge plate and a second hinge plate secured in a parallel relationship, to a first hinge plate and a second hinge plate biased-open non-parallel relationship, comprising:
 arranging a first cam arrangement on an upper edge of the second hinge plate;
 arranging a second cam arrangement on an elongated edge of the first hinge plate;
 rotating the first cam arrangement about a first axis to enable an elongated locking plate attached to the second hinge plate to bias pivotable open the first hinge plate from the second hinge plate;
 pivoting a cam lever comprising a part of the first cam arrangement so as to enable the rotation of the first cam arrangement about the first axis to retract a bias from the elongated locking plate to enable release-directed movement of the elongated locking plate from a hinge locked configuration on the second hinge plate to a hinge openable configuration;
 pushing a flanged upper end of the elongated locking plate upwardly away from the upper edge of the second hinge plate by a spring arranged therebetween, to enable released displacement of the elongated locking plate with resect to the first elongated edges of the first hinge late and the second hinge plate;
 enabling the pushing of the flanged upper end of the elongated locking plate by the placement of the compressed spring placed between the upper edge of the second hinge plate and the flanged upper end of the elongated locking plate;
 rubbing a plurality of pins extending perpendicularly outwardly from the elongated edge of the first hinge plate against a corresponding plurality of sloped curvilinear cam surfaces each on respective cam slots arranged in the released, displaced elongated locking plate to effect a cammed pushing open of the elongated edge of the first plate from the elongated edge of the second plate;
 arranging a communication port through correspondingly adjacent locations in the first hinge plate and the second hinge plate to permit a communication conduit to be safely arranged therebetween.

9. A lockable hinge arrangement comprising a first hinge plate and a second hinge plate, the first and the second hinge plates being hingedly connected to one another at one elongated first edge thereof to comprise the hinge arrangement, the hinge arrangement further comprising:
 a longitudinally displaceable elongated locking plate slidably attached to a second elongated edge of the second hinge plate, the displaceable locking plate arranged to secure engagement with and release of the first hinge plate and the second hinge plate from a cammed interlocking relationship with one another, and
 a locking plate cam arrangement attached to the second hinge plate for contact with and effecting and permitting the displacement of the elongated locking plate and forced separating release of the first hinge plate and the second hinge plate from rigid securement with one another, wherein the elongated displaceable locking plate on the second hinge plate has a plurality of cam slots thereon, and the first hinge plate has a corresponding plurality of engagement pins thereon, wherein particular respective longitudinal displacement of the elongated locking plate effects respective engagement therewith and disengagement therefrom with the respective engagement pins, depending on the direction of displacement movement of the elongated locking plate.

10. The lockable hinge arrangement as recited in claim 9, wherein the elongated locking plate is acted upon by a first cam arrangement to effect longitudinal movement of the elongated locking plate with respect to the second hinge plate.

* * * * *